(12) United States Patent
Hara et al.

(10) Patent No.: US 7,933,699 B2
(45) Date of Patent: Apr. 26, 2011

(54) AUTOMATIC CONTROL APPARATUS

(75) Inventors: Tetsuya Hara, Okazaki (JP); Kazuyuki Natsume, Toyohashi (JP)

(73) Assignee: DENSO CORPORATION, Kariya (JP)

(*) Notice: Subject to any disclaimer, the term of this patent is extended or adjusted under 35 U.S.C. 154(b) by 852 days.

(21) Appl. No.: 11/889,533

(22) Filed: Aug. 14, 2007

(65) Prior Publication Data

US 2008/0059024 A1   Mar. 6, 2008

(30) Foreign Application Priority Data

Aug. 30, 2006   (JP) ................................ 2006-234192

(51) Int. Cl.
*B60W 50/08* (2006.01)
*B60R 16/02* (2006.01)

(52) U.S. Cl. ......................................... 701/36; 340/438

(58) Field of Classification Search ........................ None
See application file for complete search history.

(56) References Cited

U.S. PATENT DOCUMENTS

| | | | |
|---|---|---|---|
| 5,247,440 A * | 9/1993 | Capurka et al. .................. 701/49 |
| 6,108,602 A | 8/2000 | Bairamis | |
| 6,314,352 B1 | 11/2001 | Kunimatsu et al. | |
| 6,411,894 B2 * | 6/2002 | Yamamoto et al. ........... 701/208 |
| 7,302,339 B2 * | 11/2007 | Gray ............................. 701/200 |
| 7,567,864 B2 * | 7/2009 | Ziehr et al. ....................... 701/49 |
| 7,657,352 B2 * | 2/2010 | Hattori et al. ................... 701/36 |
| 2005/0004732 A1 * | 1/2005 | Berry et al. ....................... 701/48 |
| 2008/0065293 A1 * | 3/2008 | Placke et al. ................... 701/41 |

FOREIGN PATENT DOCUMENTS

| | | |
|---|---|---|
| DE | 197 40 562 A1 | 3/1998 |
| DE | 102 00 883 A1 | 1/2003 |
| DE | 101 53 119 A1 | 5/2003 |
| DE | 10 2004 040 829 A1 | 3/2006 |
| DE | 10 2004 043 853 B3 | 4/2006 |
| JP | A-7-172145 | 7/1995 |
| JP | A-9-142232 | 6/1997 |
| JP | A-2006-293683 | 10/2006 |
| WO | WO 2006/045667 A1 * | 5/2006 |

OTHER PUBLICATIONS

Office Action dated Feb. 1, 2010 from the German Patent Office for corresponding DE patent application No. 10 2007 040 346.3-34 (English translation enclosed).

Office Action dated Aug. 27, 2009 from the German Patent Office for corresponding patent application No. 10 2007 040 346.3-34 (English translation enclosed).

* cited by examiner

*Primary Examiner* — Michael J. Zanelli
(74) *Attorney, Agent, or Firm* — Posz Law Group, PLC (57) ABSTRACT

An automatic control system stores information of an executed automatic control in a memory, and lists records of automatic controls that are cancellable based on an instruction from a user of the automatic control system. When the user selects the record of the executed automatic control in the list, the automatic control system sends to a subject device an instruction that instructs the subject device to return to a pre-execution condition of the automatic control performed on the subject device.

11 Claims, 5 Drawing Sheets

| ID | AUTO-CONTROL NAME | CONTROL METHOD | CANCELLABLE | IN-OP |
|---|---|---|---|---|
| 1 | TUNNEL TRAVEL | PROPOSAL BASIS | × | ○ |
| 2 | REVERSE ASSIST | AUTO | × | ○ |
| 3 | AUDIO CONFIG. CHANGE | AUTO | × | ○ |
| 4 | DENSE-FOG TRAVEL | PROPOSAL BASIS | ○ | ○ |

AUTOMATIC CONTROL APPARATUS

CROSS REFERENCE TO RELATED APPLICATION

This application is based on and claims the benefit of priority of Japanese Patent Application No. 2006-234192 filed on Aug. 30, 2006, the disclosure of which is incorporated herein by reference.

FIELD OF THE DISCLOSURE

The present disclosure generally relates to an automatic control apparatus for use in a vehicle.

BACKGROUND INFORMATION

In recent years, various techniques for automatically controlling vehicular devices such as a front light, a motorized window, switching of an air-conditioner to an internal circulation or the like according to, for example, information from a navigation system are proposed. However, the automatic control of those devices does not always reflect an intention of the occupant of the vehicle, that is, the automatic control of those devices is provided according to an averaged and well-rounded standard of everybody's sense, thereby sometimes making the automatic control diverted from a desired intention of the occupant. Thus, the automatic control may provide inconvenience, discomfort and/or unpleasant feeling to the occupant due to the unsuitability to the occupant intention.

Thereupon, Japanese patent document JP-A-2000-127869 discloses an invention for resolving the above problem. The above invention discloses that the content of the control is notified to the occupant in advance, and the automatic control is provided only after having an affirmative or negative response to the notification of the content of the automatic control from the occupant.

However, when the occupant's understanding of the content of the automatic control is not sufficient for yielding an intended condition, or when the occupant changed his/her mind after responding affirmatively to the notification of the automatic control, the occupant feels like canceling the automatic control to return to a pre-execution condition of the automatic control. In that case, the occupant must provide a specific operation for respective contents of the automatic control for canceling the contents of the automatic control, which causes a great amount of trouble for the occupant.

SUMMARY OF THE DISCLOSURE

In view of the above and other problems, the present disclosure provides an apparatus that provides an ease of canceling of an execution of an automatic control even after the execution of the automatic control.

The apparatus of the present disclosure includes a reception unit, a detection unit and a control unit. The reception unit receives from a user an instruction, and the detection unit detects an execution of each of plural types of automatic control. Further, the control unit transmits an operation signal for restoring a pre-execution condition of the automatic control on a subject device when a restoration instruction for restoring the pre-execution condition is received by the reception unit after a detection of the execution of the automatic control by the detection unit. In this case, the "condition" indicates an operation condition of the subject device.

The apparatus described above enables the user to restore the pre-execution condition of the automatic control by merely inputting a restoration instruction to the reception unit. That is, performing a complicated operation for canceling respective contents of the automatic control by the user is avoided, thereby providing an improved convenience and an ease of operation for the user.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings. The embodiments of the present disclosure are not limited to the following forms, but may take various forms within the scope of the applicable art.

Figure 1:
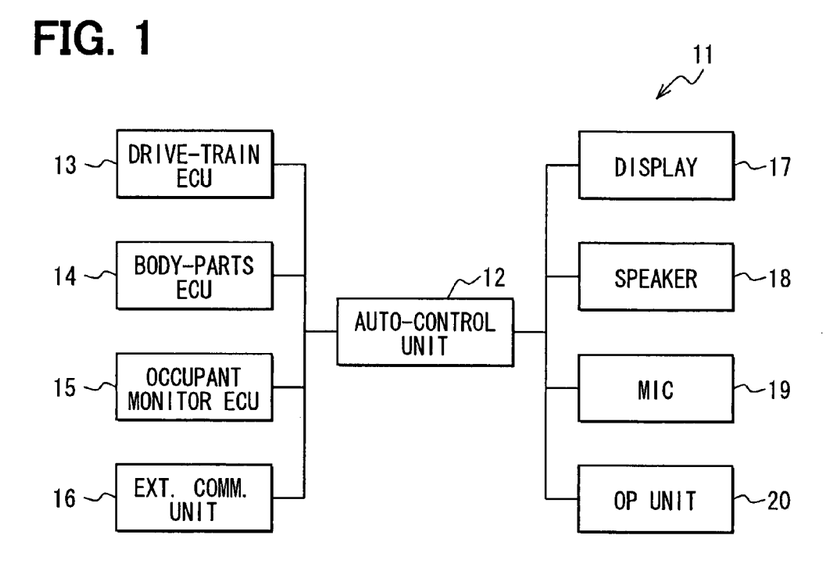
FIG. 1 shows a block diagram of an automatic control system in an embodiment of the present disclosure.

FIG. 1 is a block diagram showing the outline constitution of an automatic system 11 in the present embodiment. The automatic system 11 includes an automatic control unit 12, a drive-train ECU 13, a body-parts ECU 14, an occupant monitor ECU 15, an external communication unit 16, a display unit 17, a speaker 18, a microphone 19 and an operation unit 20.

The automatic control unit 12 is connected to the drive-train ECU 13, the body-parts ECU 14, the occupant monitor ECU 15, and the external communication unit 16 through a vehicle LAN that is not shown in the figure. In addition, it is connected to the display unit 17, the speaker 18, the microphone 19 and the operation unit 20 directly. The inside constitution of the automatic control unit 12 is described later.

The drive-train ECU 13 is a group of ECUs consisting of ECUs related to travel of the vehicle such as an engine ECU, an automatic transmission (AT)-ECU, and a brakes ECU. The body-parts ECU 14 is an ECU group consisting of ECUs related to the vehicle equipment such as a door lock ECU, a window ECU, an air-conditioner ECU, and an audio system ECU.

The occupant monitor ECU 15 is an ECU for monitoring information provided from a camera photographing the face of the occupant or the like and from a sensor installed in the seat. The external communication unit 16 is a communications equipment having a communication with facility such as a center of the VICS (Vehicle Information Communication Service operated in JAPAN) and with other vehicles.

The display unit 17 consists of a liquid crystal panel or an organic electroluminescence panel, and it is a device to display the information that has been sent from the automatic control unit 12. On a surface of the display unit 17, a touch panel with a pressure sensing method, an electromagnetic induction method, a capacitance method is installed in an integral manner, and the surface of the display unit 17 is able to accept an operation instruction from a user. In addition, the display unit 17 may consist of plural parts, and, in that case, each part of the display unit 17 should share indication contents. In addition, each part of the display unit 17 may be installed in each seat.

The speaker 18 outputs the voice signal which has been sent from the automatic control unit 12 as a sound, and the speaker 18 is installed in the position where the sound therefrom reaches mainly for a vehicle driver.

The microphone 19 inputs the sound that an occupant uttered and converts it into a voice signal and outputs it to the automatic control unit 12, and it is installed in the position where a voice from the vehicle driver can be inputted into. The operation unit 20 consists of a mechanical key switch and a haptic device (the device which can apply a resistance power for the operation of an operator) or a gesture device (the device which detects the physical operation that the operator performed by using a camera, and can recognize it as an instruction), and provides an output to automatic control unit 12 based on the input instruction. In addition, the operation unit 20 is installed in the position that a vehicle driver can operate, and the key switch is preferably disposed on the steering wheel in particular.

Figure 2:
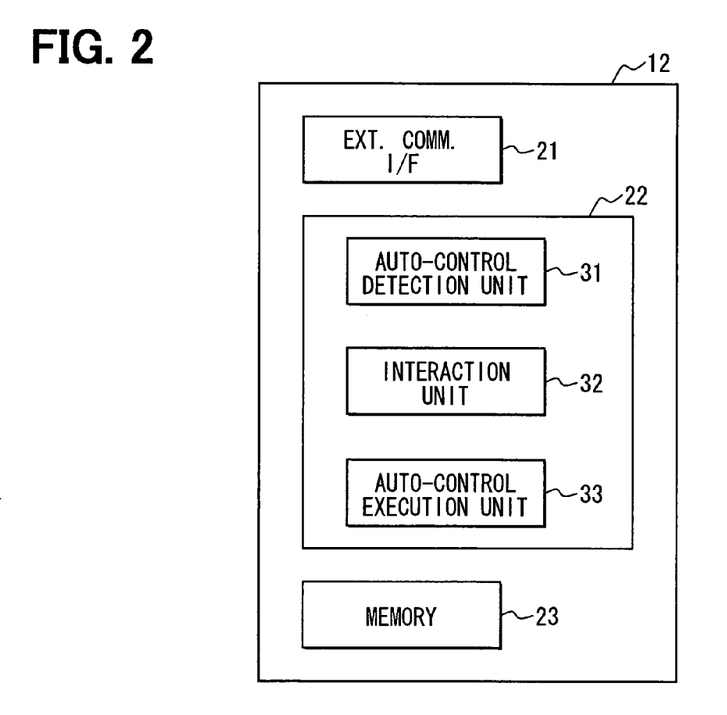
FIG. 2 shows a block diagram of an automatic control unit in the automatic control system.

The block diagram of FIG. 2 is used to show an inside constitution of the automatic control unit 12 in detail. The automatic control unit 12 includes an external communication I/F 21 and a control unit 22 and a memory 23 as in FIG. 2.

The external communication I/F 21 is a part providing a communication function with various ECUs and the devices described above, and the external communication I/F 21 consists of a microcomputer for communication or the like. The control unit 22 consists of a CPU, a ROM, a RAM, and a bus, and logically realizes an automatic control detection unit 31, a interaction unit 32 and an automatic control execution unit 33 by using those parts.

The automatic control detection unit 31 watches the drive-train ECU 13 and an operation state of the body-parts ECU 14, and detects an execution of a predetermined automatic control. More practically, the automatic control detection unit 31 detects an automatic operation of a compressor and a fan automatically by the air-conditioner ECU for preventing the cloudiness of the window and/or the volume of the low level/high level are automatically raised for coping with a noise from outside by the audio ECU. In this case, the "automatic control" in the present embodiment indicates that one or more processes are carried out in a bundle even if a user does not specifically instruct the individual process operation (the same applies in the following). In addition, the automatic control that automatic control detection unit 31 detects are the automatic control except for the automatic control that is carried out by the automatic control execution unit 33.

The interaction unit 32 determines whether the automatic control is possible based on information provided from the drive-train ECU 13, the body-parts ECU14, the occupant monitor ECU 15 and the external communication unit 16, and transmits information of the automatic control to a user by using the display unit 17 and the speaker 18 when it is possible. Then, whether to execute the automatic control is determined based on information from the microphone 19 and the operation unit 20 by a user, and the subject automatic control is put to execution by the automatic control execution unit 33 upon having a determination the automatic control is executed.

The automatic control execution unit 33 reads information that it is necessary for execution from the memory region 23 upon receiving an instruction to execute the automatic control from the interaction unit 32, and transmits an operation signal to the drive-train ECU 13 and the body-parts ECU 14 based on the information.

The memory 23 consists of a flash memory and memorizes various information. The control unit 22 memorizes program codes to realize the automatic control detection unit 31, the interaction unit 32, and the automatic control execution unit 33 and data which each of those parts uses for an execution of the program codes.

Next, various processes executed by the control unit 22 of the automatic control unit 12 are described. In this case, the distinction between the automatic control detection unit 31, the interaction unit 32 and the automatic control execution unit 33 is not basically put forth for the ease of description, thereby attributing execution of the processes to the control unit 22.

Figure 3:
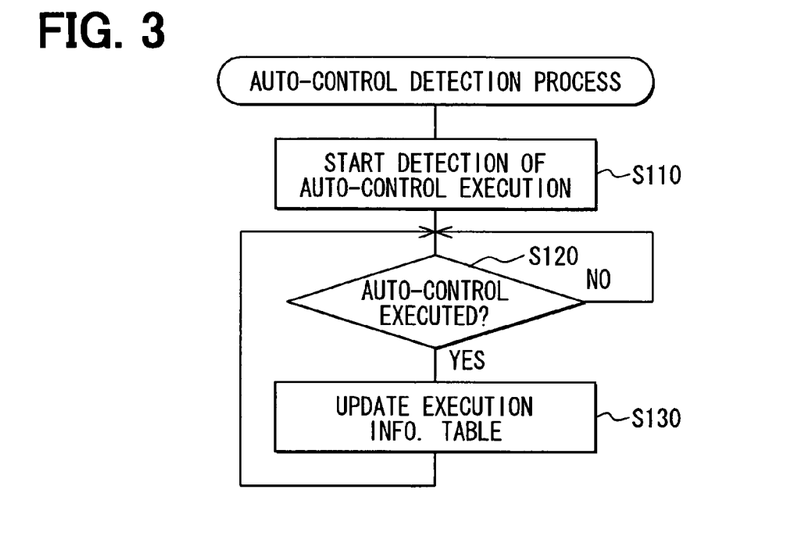
FIG. 3 shows a flowchart of an automatic control detection process.

At first, the automatic detection process is described with reference to a flowchart in FIG. 3. In this case, execution of the automatic detection process is started when a power supply to the automatic control unit 12 is started.

When the control unit 22 of the automatic control unit 12 starts an execution of the automatic detection process, at first it starts a detection of the automatic control (S110). That is, the control unit 22 watches the drive-train ECU 13 and an operation condition of the body-parts ECU 14 through the external communication I/F 21, and detects a predetermined automatic control detects. More practically, an automatic operation of a compressor and a fan by the air-conditioner ECU for preventing the cloudiness of the window and/or an automatic increase of the volume of the low/high level by the audio system ECU for coping with a noise from outside is detected.

Then, whether an execution of the automatic control has been detected is determined (S120). As a result, when the execution of the automatic control is detected (S120: YES), the process proceeds to step S130: when the execution of the automatic control has not been detected (S120: NO), the process remains in this step until the detection of the execution of the automatic control.

In step S130, which comes after the detection of the execution of the automatic control, information about the automatic control is added to an execution information table memorized to the memory 23. Details of the "execution information table" is described later.

The control unit 22 returns to step S120 after adding the information about the automatic control that has been detected to the execution information table.

Figure 6:
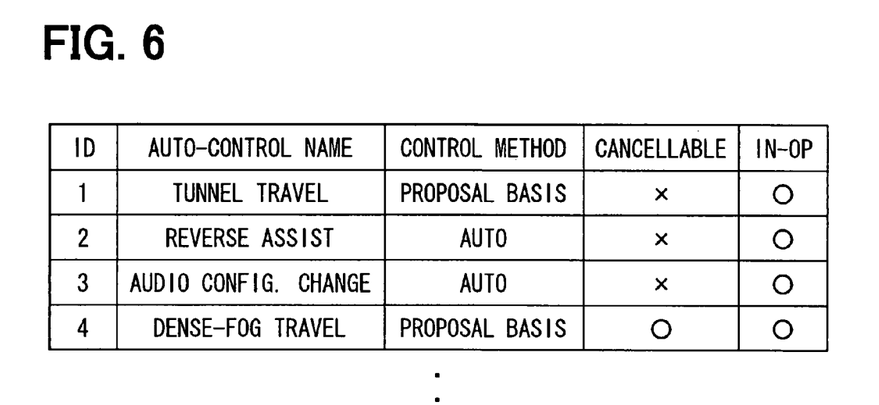
FIG. 6 shows an illustration of an execution information diagram.

Now, the execution information table in the memory 23 is described with reference to the illustration in FIG. 6.

Each of a record in the execution information table corresponds to each execution of the automatic control, and the record consists of an ID for uniquely identifying the record, an automatic control name, a control method that specifies whether the execution of the process is based on a proposal after interaction or based on an automatic control of the apparatus, a cancellability of the execution that specifies whether the automatic control is cancellable, and an in-operation indicator that indicates whether the automatic control is in-operation.

For example, from the record 1 (record ID 1 in the table), the automatic control name is "a tunnel travel", the control process is started based on the proposal from the interaction process described later, the control process is currently not cancellable, and the process is now in-operation.

Figure 4:
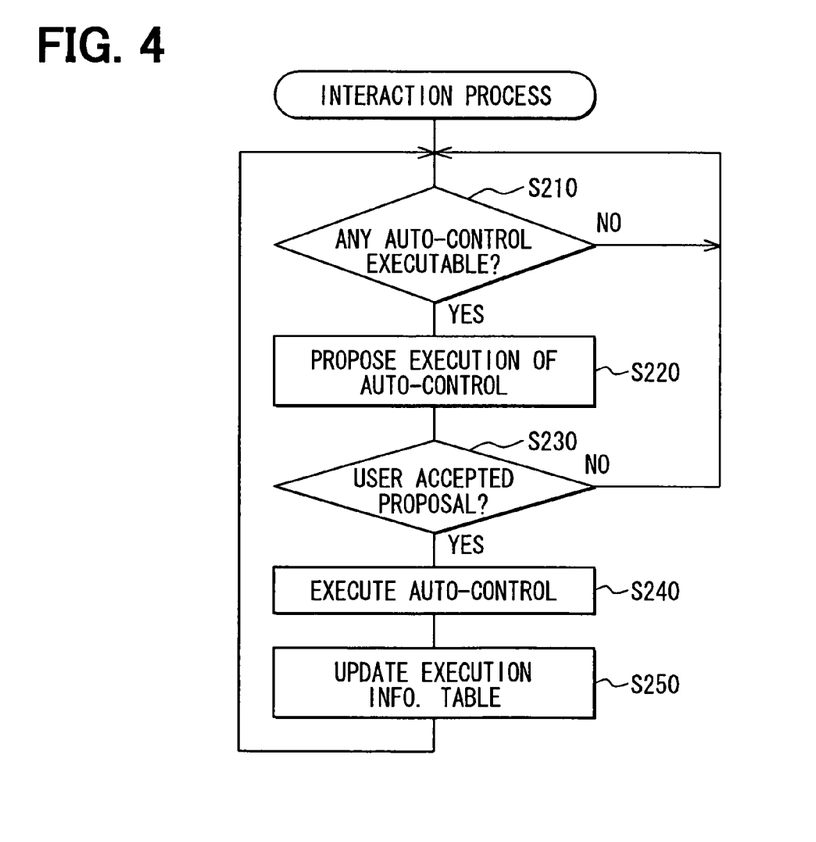
FIG. 4 shows a flowchart of an interaction process.

Next, the interaction process executed by the automatic control unit 12 is described with reference to a flowchart in FIG. 4. In this case, the interaction process is started when a power supply to the automatic control unit 12 is started.

The control unit 22 of the automatic control unit 12 determines whether at first there is an automatic control to be ready to execute (S210). That is, the control unit 22 determines whether an executable automatic control (i.e., window closing at the time of the tunnel approach and a use of a fog lamp in a dense fog area) based on the information from the drive-train ECU 13, the body-parts ECU 14, the occupant monitor ECU 15 and the external communication unit 16. In this case, the automatic control should be suitable to a current condition of the vehicle. In addition, though the information on the content of the automatic control, the conditions for execution and the like is stored in the memory 23, the information described above is well-known art and thereby omitted from the description.

When, as a result of this determination, there is an executable automatic control (S210: YES), the process proceeds to step S220. When there is no executable automatic control (S210: NO), the process stays in the present step until an executable automatic control comes up.

In step S220 which comes after the determination that there is an executable automatic control, the execution of the automatic control that is determined to be executable in the previous step is proposed. More practically, the content of the proposal is displayed on the display unit 17, and the content of the proposal is output from the speaker 18 at the same time.

Then, whether the proposal is accepted is determined (S230). More practically, whether a voice of acceptance is input to the microphone 19, or whether an operation of acceptance is performed on the operation unit 20 is determined. As a result, when the proposal is determined to be accepted (S230: YES), the process proceeds to step S240. When the proposal is determined not to be accepted (S230: NO), the process returns to step S210.

In step S240 which comes after the determination that the proposal is accepted, the automatic control is executed. More practically, the operation signal is transmitted to the drive-train ECU 13 and the body-parts ECU 14 based on the contents of the automatic control memorized in the memory 23.

Then, the control unit 22 adds the information about the executed automatic control to the execution information table (S250). Then, the process returns to step S210.

Next, the cancel process executed by the automatic control unit 12 is described with reference to a flowchart in FIG. 5. In this case, the cancel process is started when a power supply to the automatic control unit 12 is started.

The control unit 22 of the automatic control unit 12 determines whether at first a new record is added to the execution information table when it starts the execution of the cancel process (S305). When a new record is determined to be added to the execution information table (S305: YES), the process proceeds to step S310. When a new record is determined not to be added to the execution information table (S305: NO), the process proceeds to step S330.

In step S310 which comes after the determination that a new record is added to the execution information, whether the automatic control that corresponds to the added new record is cancellable is determined. That is, the automatic control is determined to be cancellable when the current travel condition is not affected by the cancellation of any process in the automatic control, or is determined to be not cancellable when the cancellation affects the current travel condition by including a process being problematic for the travel of the vehicle with cancellation. The determination is based on the information from the drive-train ECU 13, the body-parts ECU 14, the occupant monitor ECU 15, and the external communication unit 16. For example, the control process such as turning off of the headlamp during the travel in a tunnel is determined to be problematic for the travel of the vehicle when cancelled, and an increase of the temperature of the air-conditioner is determined to be not problematic for the travel of the vehicle if the control process is cancelled.

When, in a determination in step S310, the automatic control corresponding to an added record is cancellable (S310: YES), the process proceed to step S315. When the process corresponding to the added record is not cancellable (S310: NO), the process returns to step S305.

In step S315 which comes after the determination that the automatic control corresponding to the added record is cancellable, a message that notifies that the content of the automatic control and that the automatic control is cancellable is displayed on a screen of the display unit 17. In this case, the voice message for notifying the same message is output from the speaker 18. Then, the process proceeds to step S320.

An example of a screen 501 on the display unit 17 is described with reference to the illustration in FIG. 7.

Figure 7:
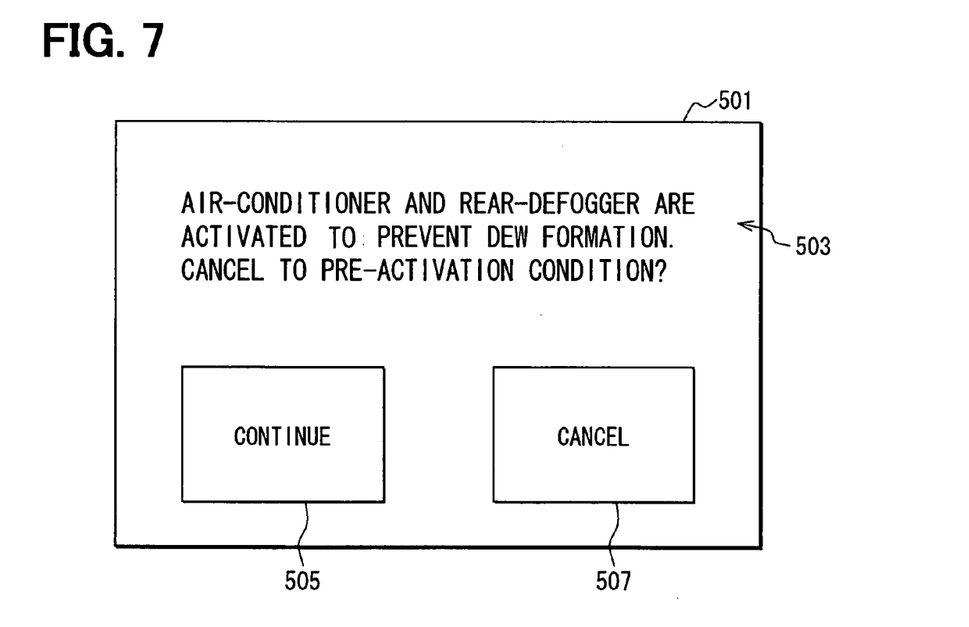
FIG. 7 shows an illustration of an information screen for displaying contents of an automatic control and cancellability of the control.

As shown in FIG. 7, the screen 501 includes a message 503, a continue button 505, and a cancel button 507. The message 503 reads "Air-conditioner and rear-defogger are activated to prevent dew formation. Cancel to pre-activation condition?" The continue button 505 changes its color for confirmation when it is touched by a user. The cancel button 507 changes its color in the same manner.

Figure 5:
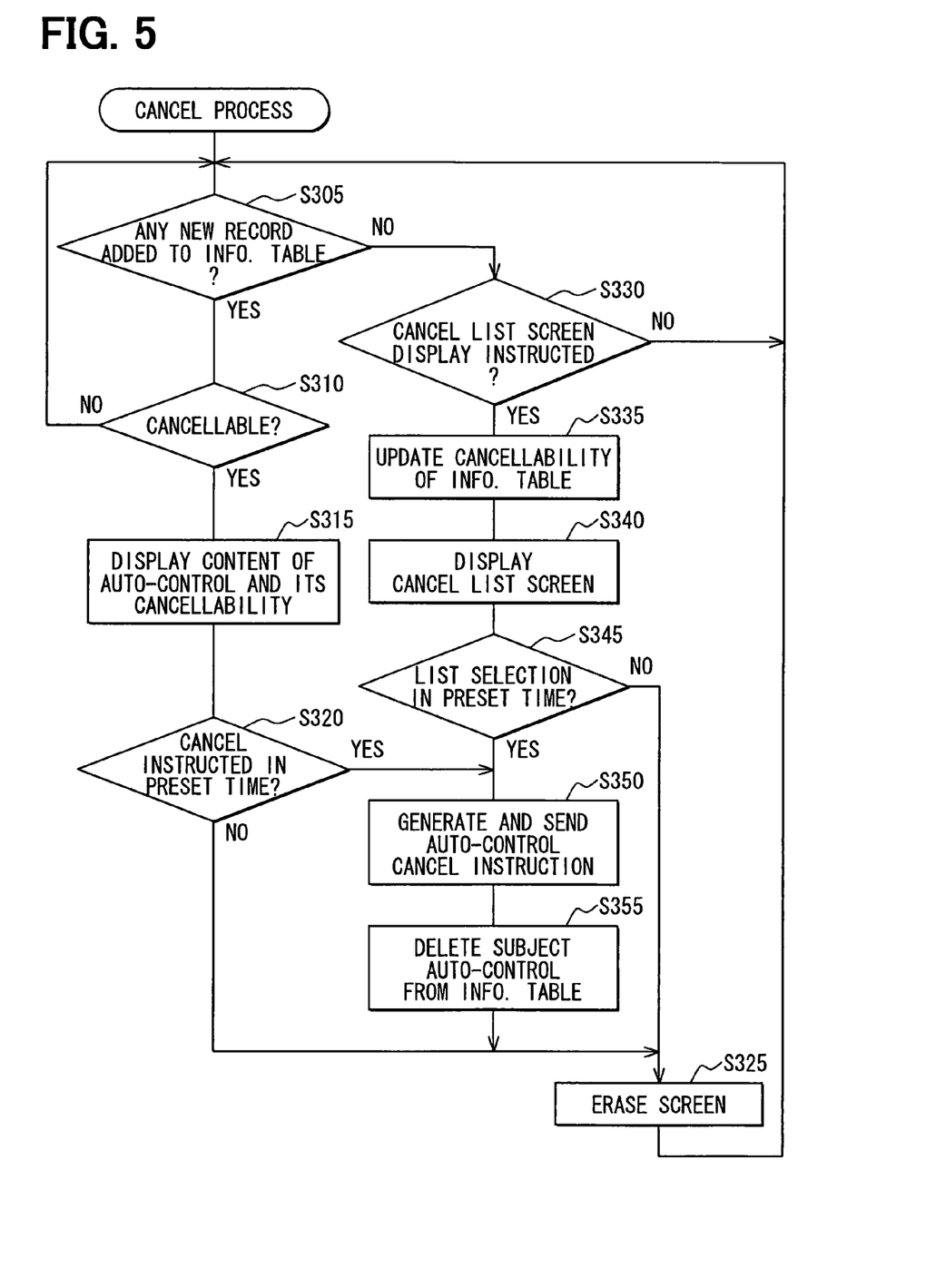
FIG. 5 shows a flowchart of a cancel process.

In step S320 in FIG. 5, whether a cancel instruction is provided within a preset time is determined. That is, when the cancel button 507 in the screen 501 is touched by the user (or an operation equivalent to the touch on the cancel button 507 is provided for the operation unit 20), the process determines that the cancel instruction is provided. On the other hand, when the continue button 505 in the screen 501 is touched by the user (or an operation equivalent to the touch on the continue button 505 is provided for the operation unit 20), the process determines that no cancel instruction is provided. In this case, an appropriate amount of the preset time is within a range between 30 seconds to three minutes. As a result, when the cancel instruction is determined to be provided (S320: YES), the process proceeds to step S350. When the cancel instruction is determined not to be provided (S320: NO), the process proceeds to step S325.

In step S325, the screen of the cancel process displayed on the display unit 17 is erased. Then, the process returns to step S305.

In step S330 which comes after the determination that the new record is not added to the execution information table in step S305, the process determines whether there is an instruction for displaying a list of cancellable automatic controls on the screen is determined (S330). The determination is based on information from the touch panel on the surface of the display unit 17, or information from the operation unit 20. As a result, when the list display instruction is determined to be provided (S330: YES), the process proceeds to step S335. When the instruction is determined not to be provided (S330: NO), the process returns to step S305.

In step S335 which comes after the determination that the list display instruction is provided, the cancellability in each of the records in the execution information table is updated. The update is performed based on the information from the drive-train ECU 13, the body-parts ECU 14, the occupant monitor ECU 15, and the external communication unit 16. For example, the control process such as turning on of the headlamp during the travel in a tunnel is updated as not cancellable (i.e., "X" sign in the list) due to the problematic effect for the travel of the vehicle by the cancellation of the process in the automatic control, and the increase of the temperature of the air-conditioner is updated as cancellable (i.e., "O" sign in the list) due to the effect of the process in the automatic control being free from the problematic effect.

Then, a cancel list screen is displayed on the display unit 17 based on the updated execution information table (S340). In this case, only the records of the automatic control that are cancellable ("O" sign in the cancellable column) and are in-operation ("O" sign in the in-op column) are displayed on the display unit 17.

An example of the screen is described with reference to a screen 551 in FIG. 8.

Figure 8:
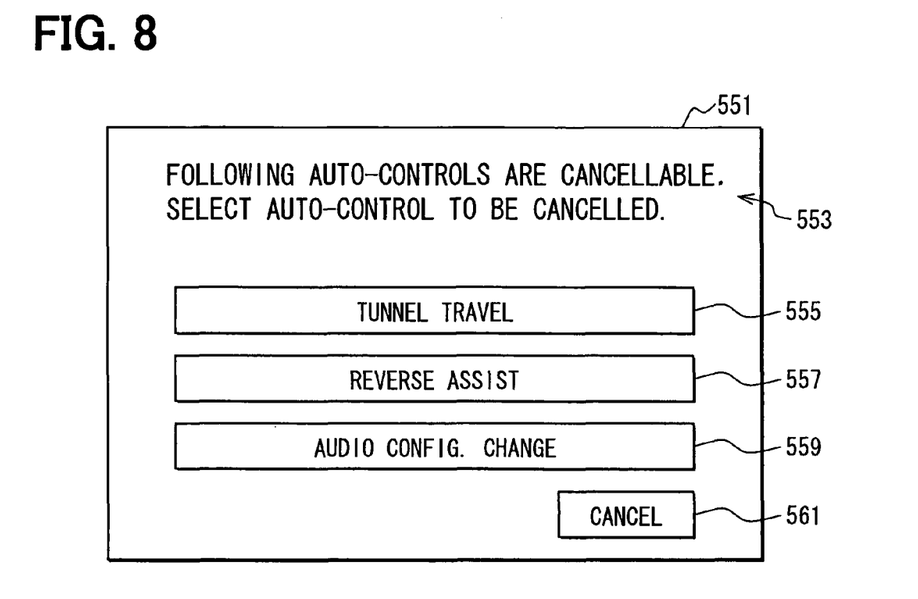
FIG. 8 shows another illustration of the information screen for displaying cancelable automatic controls.

As shown in FIG. 8, the screen 551 includes a message 553, a tunnel travel button 555, a reverse assist button 557, an audio configuration change button 559, and a cancel button 561. The message 553 reads "Following automatic controls are cancellable. Select automatic control to be cancelled." The tunnel travel button 555 corresponds to the automatic control with the control name "tunnel travel" (turns on the headlamp, closes all windows, sets an internal circulation to the air-conditioner). The reverse assist button 557 corresponds to the automatic control with the control name "reverse assist" (turns on a back monitor, change an angle of the door mirror for reverse travel, operates a rear wiper only in the rainy weather when a user shifts to reverse). The audio configuration change button 559 corresponds to the automatic control with the control name "audio configuration change" (increases intensity of the high/low tone and volume of the sound for a travel in an expressway). The cancel button 561 is a button for closing the screen 551. In this case, the color of the tunnel travel button, the reverse assist button 557, the audio configuration change button 559, and the cancel button 561 changes when those buttons are touched for explicitly displaying the touch by the user.

In step S345 in FIG. 5, the process determines whether one of the automatic controls in the list is selected in a preset time is determined. That is, when the tunnel travel button 555, the reverse assist button 557, or the audio configuration change button 559 is touched by the user (or an operation equivalent to the touch of those buttons is performed on the operation unit 20), the automatic control is determined to be selected. On the other hand, when the cancel button 561 is touched by the user (or an operation equivalent to the touch of the cancel button 561 by the user is performed), the process determines no automatic control is selected in the list. In this case, the preset time is preferably determined as a duration between 30 seconds to 3 minutes. As a result, when the automatic control in the list is determined to be selected (S345: YES), the process proceeds to step S350. When no automatic control in the list is determined to be selected (S345: NO), the process proceeds to step S325.

In step S350, an operation instruction for canceling the automatic control is generated and transmitted. For example, when the automatic control to be cancelled is the "tunnel travel," the following operation instruction is generated and transmitted. That is, when the headlamp had been turned off before the automatic control is executed, an operation instruction to turn off the headlamp is generated and transmitted to a headlamp control ECU. Further, when a window had been opened before the automatic control is executed, an operation instruction to open the window to a previous position is generated and transmitted to a window control ECU. Furthermore, the air-conditioner had been set to the internal circulation before the execution of the automatic control, an operation instruction to set the internal circulation is generated and transmitted to an air-conditioner control ECU.

Then, the record that corresponds to the automatic control that is cancelled is deleted from the execution information table (S355). Then, the process proceeds to step S325.

In the operation scheme described above, the user (e.g., a driver of the vehicle) can restore the pre-execution condition of the automatic control with ease. That is, the user can avoid a specific control of each of the processes in the automatic control for canceling the automatic control and restoring the pre-execution condition.

Further, the message is provided for the user that the pre-execution condition is restorable from the display unit (S315, S340), thereby enabling the use to restore the pre-execution condition even when the user is not aware of the execution of the automatic control.

Furthermore, the cancelability of the automatic control is examined prior to the cancellation (S310, S335), thereby preventing inappropriate cancellation of the automatic control.

Although the present invention has been fully described in connection with the preferred embodiment thereof with reference to the accompanying drawings, it is to be noted that various changes and modifications will become apparent to those skilled in the art.

For example, though the cancellability of the automatic control is determined by a unit of the automatic control in the above embodiment, the automatic control unit 12 may determine the cancellability for each of the processes in an automatic control. That is, the automatic control "tunnel travel" includes three processes such as a process for turning on a headlamp, a process for closing all windows, and a process for setting an internal circulation to the air-conditioner, the cancellability of the process for turning off the headlamp (e.g., May the headlamp be turned off?), the cancellability of the process for closing all windows (e.g., May the windows be opened to a full?), and the cancellability of the process for setting the internal circulation (e.g., May the air-conditioner be set to the internal circulation?) may separately be determined. As a result, when turning off the headlamp is determined to be inappropriate based on an output of a luminosity sensor, the headlamp condition may be left unchanged and the condition of the window and the air-conditioner may be restored by transmitting the operation signal.

Further, when an execution of the process in the automatic control makes a state of the equipment to transit to another state before returning to the original state (e.g., a spouting a window washer liquid for a predetermined time or the like), the process is handled as non-cancellable. Other processes that transit from one state to another before returning to the original state includes processes such as blowing a horn for a predetermined time, operating a wiper for a predetermined cycles, or the like.

In this manner, the efficiency of the control is improved by the reduction of unnecessary transmission of the operation signal.

Furthermore, though the user in the above embodiment can instruct the cancellation of the automatic control by the unit of the automatic control (refer to FIGS. 7 and 8), the cancellation may be instructed by the unit of each of the processes in the automatic control. More practically, when the user instructed the cancellation in FIG. 7, or when the user selected the automatic control to be cancelled in FIG. 8, a screen 601 in FIG. 9 may be displayed on the display unit 17 for allowing the user to select a process to be cancelled. The screen 601 includes a message 603, a headlamp button 605, a window button 607, an air-conditioner button 609, and a cancel button 611. The message 603 reads "Automatic control 'Tunnel travel' is to be cancelled. Select cancel option." The headlamp button 605 corresponds to the cancellation process for turning off the headlamp. The window button 607 corresponds to the cancellation process for opening the window to the full. The air-conditioner button 609 corresponds to the cancellation process for setting the air-conditioner to the external circulation. The cancel button 611 closes the screen 601.

Figure 9:
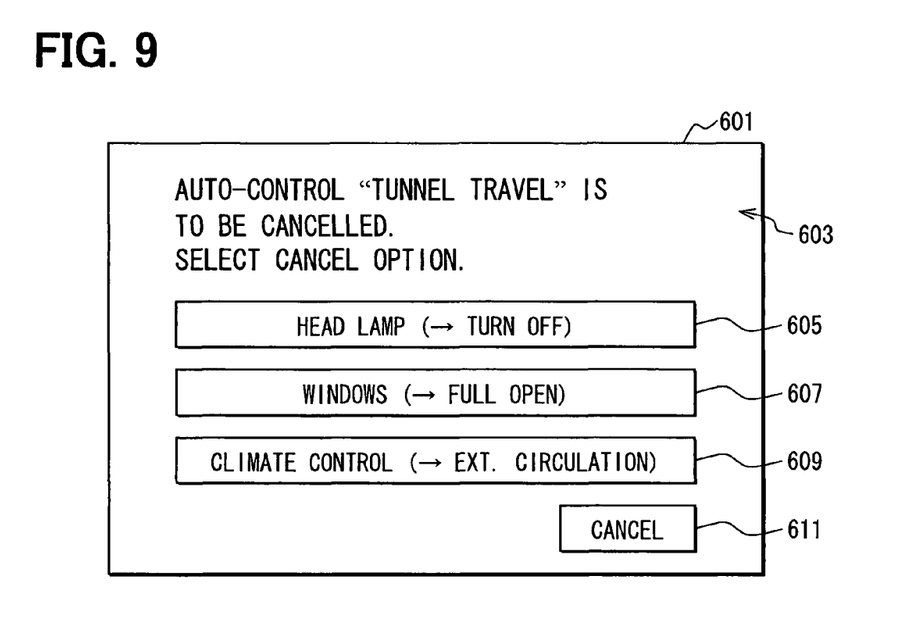
FIG. 9 shows another illustration of the information screen for displaying cancel options of an automatic control.

The screen 601 displayed on the display unit 17 for allowing the user to perform the cancellation of selected process only improves the convenience of the user.

Such changes and modifications are to be understood as being within the scope of the present invention as defined by the appended claims.

What is claimed is:

1. An automatic control apparatus comprising:
a reception unit that receives an instruction from a user;
a detection unit that detects an execution of each of plural types of automatic control;
a control unit that transmits an operation signal to a subject device for restoring a pre-execution condition of the automatic control when a restoration signal is received by the reception unit after a detection of the execution of the automatic control by the detection unit, and
a condition information acquisition unit that acquires surrounding information that represents at least one of a vehicle device condition and a near-vehicle field condition,
wherein the control unit determines whether the pre-execution condition of the automatic control is restored based on the surrounding information acquired by the condition information acquisition unit, and
the control unit transmits the operation signal only upon reaching a determination to restore the pre-execution condition of the automatic control.

2. The automatic control apparatus of claim 1,
wherein the automatic control under control of the detection unit and the control unit includes a combination of plural processes.

3. The automatic control apparatus of claim 1 further comprising:
a notification unit that provides a notification for a user,
wherein the control unit controls the notification unit for notifying the user that the pre-execution of the automatic control is restorable after the detection of the automatic control.

4. The automatic control apparatus of claim 3,
wherein the automatic control under control of the detection unit and the control unit includes a combination of plural processes, and
the control unit transmits the operation signal to the subject device for at least one process that is specified by the user through the reception unit among the plural processes in the automatic control.

5. The automatic control apparatus of claim 1,
wherein the control unit stores information of plural occasions of the automatic control detected by the detection unit in association with respective occasions of the automatic control, and
the control unit transmits the operation signal of a target automatic control to a subject device when an automatic control is specified as the target automatic control by the user through the reception unit.

6. An automatic control apparatus comprising:
a reception unit that receives an instruction from a user;
a detection unit that detects an execution of each of plural types of automatic control;
a control unit that transmits an operation signal to a subject device for restoring a pre-execution condition of the automatic control when a restoration signal is received by the reception unit after a detection of the execution of the automatic control by the detection unit; and
a notification unit that provides a notification for a user,
wherein the control unit controls the notification unit for notifying the user that the pre-execution of the automatic control is restorable after the detection of the automatic control, wherein
the automatic control under control of the detection unit and the control unit includes a combination of plural processes,
the control unit transmits the operation signal to the subject device for restoring the pre-execution condition when an execution of at least one of the plural processes in the automatic control leaves the subject device in an execution condition after a transition from the pre-execution condition, and
the control unit saves a transmission of the operation signal to the subject device for restoring the pre-execution condition when an execution of at least one of the plural processes in the automatic control allows the subject device to return from the execution condition to the pre-execution condition after a transition to the execution condition.

7. An automatic control apparatus comprising:
a reception unit that receives an instruction from a user;
a notification unit that provides a notification for a user;
a control unit that provides from the notification unit for the user a proposal of an execution of at least one automatic control among plural automatic controls and transmits an execution operation signal to a subject device by performing the proposed execution of the at least one automatic control upon receiving an execution instruction from a user through the reception unit; and
a condition information acquisition unit that acquires surrounding information that represents at least one of a vehicle device condition and a near-vehicle field condition,
wherein
the control unit transmits a restoration operation signal to the subject device for restoring a pre-execution condition of the automatic control when a restoration instruction is received through the reception unit after a transmission of the execution operation signal of the at least one automatic control,
the control unit determines whether the pre-execution condition of the automatic control is restored based on the surrounding information acquired by the condition information acquisition unit, and
the control unit transmits the operation signal only upon reaching a determination to restore the pre-execution condition of the automatic control.

8. The automatic control apparatus of claim 7,
wherein the automatic control under control of the control unit includes a combination of plural processes.

9. The automatic control apparatus of claim 7,
wherein the control unit stores information of plural automatic controls in association with each of the plural automatic controls, and
the control unit transmits the restoration operation signal of a target automatic control to the subject device when an automatic control is specified as the target automatic control by the user through the reception unit.

10. The automatic control apparatus of claim 7 further comprising:
wherein the automatic control under control of the control unit includes a combination of plural processes, and
the control unit transmits the restoration operation signal of a target automatic control to the subject device when an automatic control is specified as the target automatic control by the user through the reception unit.

11. An automatic control apparatus comprising:
a reception unit that receives an instruction from a user;
a notification unit that provides a notification for a user;
a control unit that provides from the notification unit for the user a proposal of an execution of at least one automatic control among plural automatic controls and transmits an execution operation signal to a subject device by performing the proposed execution of the at least one automatic control upon receiving an execution instruction from a user through the reception unit; and
a condition information acquisition unit that acquires surrounding information that represents at least one of a vehicle device condition and a near-vehicle field condition,
wherein
the control unit transmits a restoration operation signal to the subject device for restoring a pre-execution condition of the automatic control when a restoration instruction is received through the reception unit after a transmission of the execution operation signal of the at least one automatic control,
the control unit determines whether the pre-execution condition of the automatic control is restored based on the surrounding information acquired by the condition information acquisition unit,
the control unit transmits the operation signal only upon reaching a determination to restore the pre-execution condition of the automatic control,
the automatic control under control of the control unit includes a combination of plural processes, and
the control unit saves a transmission of the restoration operation signal to the subject device for restoring the pre-execution condition when an execution of the at least one process in the automatic control allows the subject device to return from the execution condition to the pre-execution condition after a transition to the execution condition.

* * * * *